Dec. 18, 1951
W. T. MILLER
2,579,437
PROCESS FOR PREPARING SOLID POLYTRIFLUOROCHLOROETHYLENE
Filed March 13, 1948
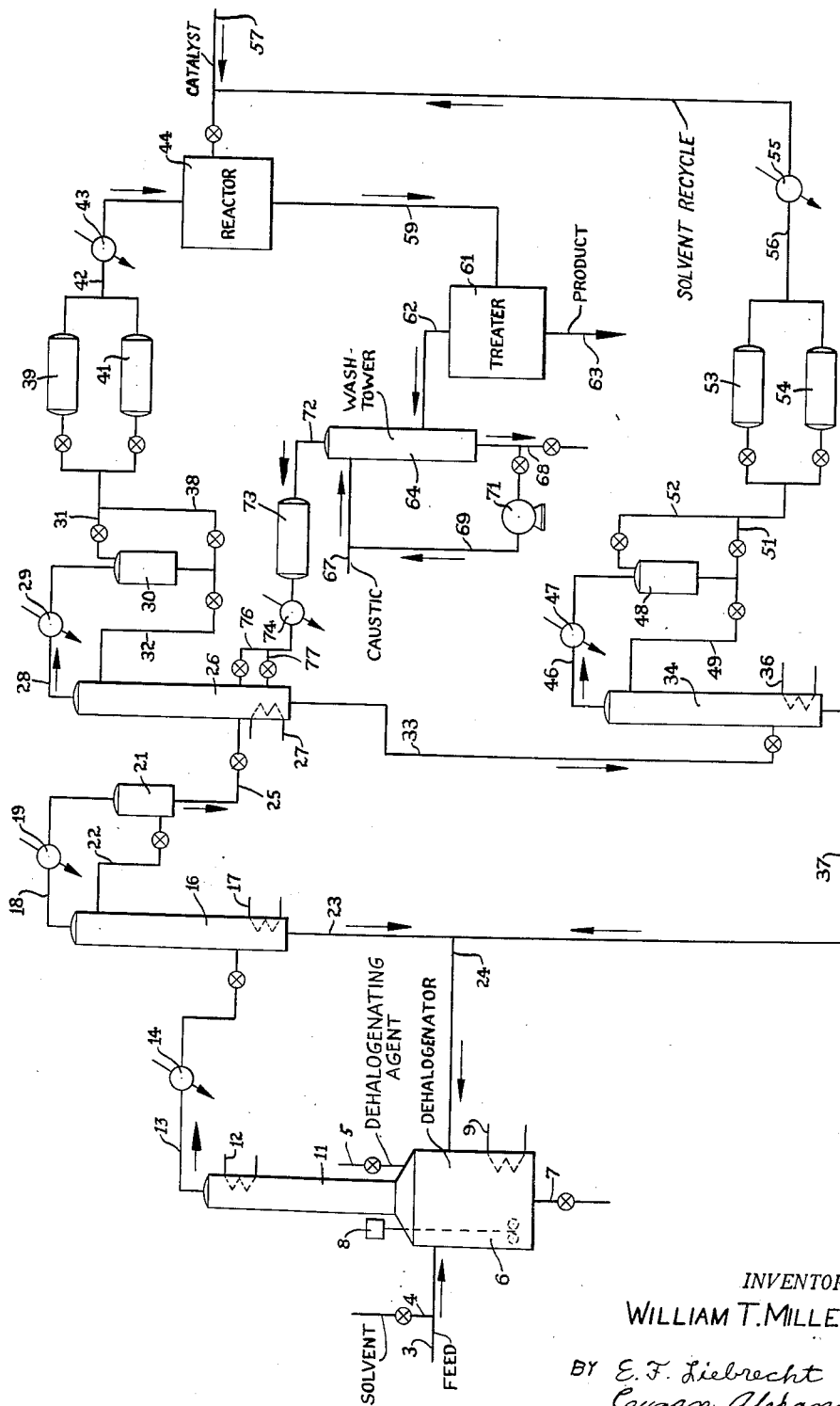
INVENTOR
WILLIAM T. MILLER
BY E. F. Liebrecht
Cruzan Alexander
His Attorneys Patented Dec. 18, 1951

2,579,437

UNITED STATES PATENT OFFICE 2,579,437

PROCESS FOR PREPARING SOLID POLY-TRIFLUOROCHLOROETHYLENE

William T. Miller, Ithaca, N. Y., assignor to The M. W. Kellogg Company, a corporation of Delaware Application March 13, 1948, Serial No. 14,797

7 Claims. (Cl. 260—92.1)

This invention relates to the manufacture of perhalocarbons. In one of its aspects, this invention relates to the polymerization of perhaloolefins. In another more particular aspect this invention relates to a process for the polymerization of perfluorochloro-olefins, such as trifluorochloroethylene, under polymerization conditions to produce halocarbons of higher molecular weight than the monomer, such as polytrifluorochloroethylene. In the latter aspect the invention relates particularly to the polymerization of trifluorochloroethylene in a continuous manner to produce a normally solid polymeric compound of high chemical and physical stability.

The polymerization of perfluorochloro-olefins which are relatively free from contaminants produces a variety of useful products. For example, the polymerization of substantially pure trifluorochloroethylene under suitable conditions produces dimers, trimers, relatively low molecular weight polymers in the oil and grease range, and normally solid polymers, including acyclic and alicyclic compounds. In general, these polymers have great physical and chemical stability, particularly as regards resistance to oxidation and attack by acids. The polymers contain only negligible amounts, if any, of such elements as hydrogen and oxygen. These polymers are also much more stable than the corresponding perchlorocarbons. As is obvious from their physical and chemical characteristics, such perhalopolymers produced from the perfluorochloro-olefins are useful for many purposes.

The object of this invention is to provide a continuous process for the polymerization of perhalo-olefins.

Another object of this invention is to provide a process for the manufacture of polytrifluorochloroethylene.

It is still another object of this invention to produce normally liquid and solid polymers of perhalocarbons.

A further object of this invention is to provide a process for the production of perhalo-polymers containing negligible amounts of impurities, such as hydrogen and oxygen.

It is still a further object of this invention to provide an integrated process for the production of perhalo-polymers from saturated perhalocarbons.

Various other objects and advantages of the present invention will become apparent to those skilled in the art from the accompanying description and disclosure.

As herein employed, "perhalocarbons" are defined as compounds consisting substantially exclusively of carbon and halogen with any degree of saturation and containing only negligible amounts of other elements, such as hydrogen and oxygen, in a quantity less than about 2 per cent. These other elements are derived from materials utilized in the process as will hereinafter become apparent. "Perfluorochloro-olefin" is defined as a perhalocarbon, particularly a perhalo-olefin with any degree of unsaturation, consisting of fluorine, carbon, and, as regards this invention, not more than one chlorine atom per atom of carbon.

In accordance with this invention a saturated perhalocarbon is dehalogenated under suitable conditions of dehalogenation in the presence of a solvent and a metallic dehalogenating agent to produce a perfluorochloro-olefin, which is the monomer for the subsequent polymerization reaction. Various solvents may be used, but, in general, the solvent should be substantially completely miscible with the perhalocarbon to be dehalogenated and, when a metal dehalogenating agent is used, also capable of dissolving the metal halide formed by the dehalogenation reaction. The boiling point of the solvent should be higher than the boiling point of the perhalo-olefin produced by the dehalogenation treatment. An effluent comprising the desired perhalo-olefin monomer including unreacted saturated halocarbon and solvent is passed to a fractional distillation system in which substantially pure perhalo-olefin is recovered as a relatively low-boiling fraction and unreacted saturated perhalocarbon and solvent are recovered as higher-boiling products. The higher-boiling products comprising unreacted saturated halocarbon and solvent are returned to the dehalogenation reaction. A perhalo-olefin overhead product substantially free from saturated perhalocarbons, solvent, and other contaminants is passed continuously or intermittently to a polymerization zone in which the perhalo-olefin monomer is polymerized under suitable polymerization conditions, and, in some instances, in the presence of a suitable catalyst or promoter. When a solid catalytic material is used, a solvent may be employed to dissolve the catalyst in order to facilitate handling and mixing with the monomer. In some types of polymerizations to be more fully discussed hereinafter, a liquid chain transfer agent or solvent is employed to advantage. To aid in the separation and recovery of such solvents from the polymerization product, it is preferred that they be lower boiling than or at least partially immiscible with the polymeric product produced by the polymerization reaction and higher boiling than the monomer.

After the desired extent of polymerization, the resulting polymerization reaction mixture is removed from the polymerization zone and treated to recover the polymeric product of the perhaloolefin and to remove any solvent and unreacted monomer. Recovered solvent and monomer are returned to the fractional distillation system, if desired. In the fractional distillation system solvent used in polymerization reaction, such as for dissolving the promoter or as a chain transfer agent, is separated and returned to the polymerization reaction zone.

For a better understanding of the present invention, reference will be made to the accompanying drawing which diagrammatically illustrates an arrangement of apparatus for the production of perhalopolymers. The drawing will be described with reference to the production of polytrifluorochloroethylene polymers from trichlorotrifluoroethane, but the process of the drawing may be applied to the production of other perhalo-polymers from other perhalo-olefins without departing from the scope of this invention. The principal pieces of apparatus of the present invention comprises a dehalogenator 6, a polymerization reactor 44, and various purification and separation equipment for purifying and separating materials utilized and produced.

According to the drawing and the process illustrated, trichlorotrifluoroethane of the 1,2,2-chloro-structure, which may be obtained commercially on the open market as Freon 113, is continuously passed through conduit 3 to dehalogenator 6. A dechlorinating agent, such as zinc dust, is continuously or intermittently introduced through conduit 5 into reactor 6. Although zinc is preferred, various dechlorinating agents may be used, such as tin, magnesium, iron, and aluminum, without departing from the scope of this invention. Fresh solvent for dissolving metal halide formed in dehalogenator 6 and of the general characteristics previously discussed is continuously or intermittently introduced into feed conduit 3 through conduit 4 or alternatively directly into dehalogenator 6 by means not shown. In this discussion of the solvent used in the dechlorination of trichlorotrifluoroethane is methyl alcohol. The amount of metal dechlorinating agent introduced into dehalogenator 6 is equivalent to at least the theoretical amount necessary for removal of two halogen atoms from the halocarbon. Preferably, an excess dechlorinating agent is used in effecting the dichlorinating reaction and the excess may be as much as 100 per cent or more. It is desirable to have an amount of solvent equivalent in weight to the perhalocarbon charged, but the amount may vary depending upon the reaction conditions, the quantity generally being less for superatomspheric than for atmospheric pressures. The mixture of perhalocarbon and solvent is vigorously agitated by means of a conventional mechanical stirrer 8 to suspend the metal dechlorinating agent in the liquid mixture in the lower portion of reactor 6. Required temperatures are maintained in the liquid phase of dehalogenator 6 by conventional means, such as heating or cooling coils 9 or a jacket through which a heat exchange medium is passed at the desired temperature. For temperature below about 0° C., a light naphtha may conveniently be used. Water may be used for higher temperatures. Outlet conduit 7 is used for discharging the contents of dehalogenator 6.

For the dechlorination of trichlorotrifluoroethane to trifluorochloroethylene, pressures between atmospheric and about 300 pounds or 400 pounds per square inch gage are employed, preferably a pressure between about 120 and 200 pounds per square inch gage, and a particularly suitable pressure is about 180 pounds per square inch gage. In the preferred form of the invention, the pressure should be sufficiently low at any given temperature to permit vaporization of the trifluorochloroethylene from the liquid phase in dehalogenator 6. A suitable temperature for the dehalogenation is between about 0° C. and 150° C. It is preferred to use a temperature between about 40 and about 80° C., usually about 70° C. At the higher temperatures the rate of reaction is increased, which in most instances is desirable. However, excessive temperatures cause undesirable side reactions.

In starting up the dehalogenation reaction a small proportion of a metal halide, such as zinc chloride, is introduced into dehalogenator 6 to promote or start the dehalogenation reaction. The metal halide may be introduced separately, or in admixture with the dechlorinating agent through conduit 5.

Suitable solvents for the dehalogenation step comprise methyl, ethyl, n-propyl, and n-butyl alcohols; dioxane, glycerol, butyl carbitol, and the Cellosolves. Other known solvents complying with the general requirements may be used, if desired, without departing from the scope of this invention. The preferred solvents are methyl alcohol and ethyl alcohol.

Since the temperature and pressure conditions which are maintained in dehalogenator 6 according to the preferred embodiment of this invention are such that the perhalo-olefin formed therein as the desired product is vaporized, the olefin passes upward together with entrained and vaporized saturated perhalocarbons and solvent through a rectification column 11. The major proportion of the perhalocarbon and solvent are retained in the liquid phase in dehalogenator 6. The upper portion of the rectification column 11 is maintained at a temperature substantially lower than the temperature of the liquid phase of dehalogenator 6, preferably at least 20° C. lower. The top temperature of column 11 is maintained at the desired level by indirect heat exchange means 12 or by refluxing a portion of liquefied overhead product. In rectification column 11, methyl alcohol solvent and trichlorotrifluoroethane are condensed and flow downward back into dehalogenator 6, while the monomer is removed therefrom through conduit 13. Since the rectification column 11 effects only a partial separation, the vaporous stream in conduit 13 will contain unremoved saturated perhalocarbon and solvent; e. g. trichlorotrifluoroethane and methyl alcohol.

A typical composition of the trifluorochloroethylene-containing stream in conduit 13 is shown below in Table I for operation of dehalogenator 6 at superatmospheric pressure and rectification column 11 at a top temperature of about −20° C.

*Table I*

| | |
|---|---|
| Monomer | vol. per cent __ 64 |
| Methyl alcohol | do ____ 15 |
| $C_2F_3Cl_3$ | do ____ 20 |
| Other material | do ____ 1 |
| | 100.0 |

The monomer-containing stream is passed through conduit 13 to a cooler 14, wherein it is liquefied, and thence to a fractional distillation column 16. As previously mentioned, a portion of the liquefied effluent in conduit 13 may be returned by means not shown to the upper portion of rectification column 11 as liquid reflux therefor to aid in maintenance of the required top temperature.

The subsequent fractional distillation of the effluent in conduit 13 is an important feature of the process of this invention since the purification of the monomer trifluorochloroethylene by the removal of the alcohol solvent and saturated perhalocarbon is essential in order to obtain satisfactory yields and reproducible results in the polymerization effected in reactor 44. To effect the purification of the monomer, liquid from conduit 13 is introduced into fractional distillation column 16 which is maintained at a temperature and pressure corresponding to that required to pass monomer overhead and to recover the solvent and unreacted saturated perhalocarbon as a bottoms product. If superatmospheric pressures are employed during the dehalogenation in unit 6, the pressure of the liquid in conduit 13 may be decreased upon introduction into distillation column 16 to aid in the fractional distillation and lower the temperatures required therein. A top temperature of about −20° C. is appropriate for atmospheric distillation in column 16. Indirect heat exchange element 17 is provided in the lower portion of column 16 as a means for controlling the temperature of the bottoms product, which is about 15° C. at atmospheric pressure. Element 17 may comprise an internal coil within column 16 or a conventional external reboiler. Upon distillation, the monomer is removed from column 16 through conduit 18 together with a relatively minor proportion of unremoved saturated halocarbon and also in some cases small amounts of methyl alcohol. The vaporous effluent is passed through conduit 18 to a conventional cooler or condenser 19 wherein the effluent is condensed. From cooler 19, the effluent is passed to an accumulator 21 in which condensate is collected. A portion of the condensate is returned to column 16 through conduit 22 as liquid reflux therefor. Internal cooling means (not shown) may be positioned within the upper portion of column 16 to aid in refluxing of the distillation column and may be used in addition to or alternatively to condensate returned through conduit 22.

The bottoms product from distillation column 16 is removed therefrom through outlet conduit 23 and is returned by means of a pump (not shown) through conduits 23 and 24 to dehalogenator 6. The bottoms product comprises the major proportion of the solvent and saturated perhalocarbon in the monomer - containing stream of conduit 13.

A typical analysis of the overhead and bottoms product for column 16 when operated at a top temperature of about −20° C. and a kettle temperature of about 15° C. at atmospheric pressure is shown in Table II below:

*Table II*

Overhead:
  Monomer (trifluorochloroethylene)
    vol. percent__ 82
  Methyl alcohol _____do____ 3
  C₂F₃Cl₃ _____do____ 14
  Other material _____do____ 1
                                      ———
                                      100

Bottoms product:
  Methyl alcohol _____ vol. percent__ 73
  C₂F₃Cl₃ _____do____ 25
  Other material _____do____ 2
                                      ———
                                      100

A portion of the stream in conduit 23 may be discarded by means not shown when the solvent has become substantially saturated and/or in order to prevent the build-up of contaminants in the system, such as by-products and polymers formed during the dehalogenation. Liquid can also be withdrawn directly from dehalogenator 6 through outlet conduit 7 for the above purpose.

In some instances it may be desirable to use a soluble stabilizer or inhibitor to prevent oxidation and/or polymerization of the monomer during distillation and storage. Such soluble inhibitors comprise a tertiary amine or terpene.

Condensate from accumulator 21 is passed through conduit 25 to a second fractional distillation column 26 in which solvent and unreacted perhalocarbon are removed from the monomer. In column 26 the control of temperature and pressure conditions is more selective than in column 16 in order to make a closer cut between the monomer and the undesired components, such as the solvent and saturated perhalocarbon. The temperature and pressure are selected such that the monomer is removed overhead through conduit 28 and is passed through a cooler 29 to an accumulator 30. Condensate at a temperature of about −28° C. is returned to the top of column 26 through conduit 32 as reflux. Solvent and saturated perhalocarbon are removed as a bottoms product through an outlet conduit 33. When operating at approximately atmospheric pressure the top temperature of column 26 is about −26° C. and the kettle temperature of column 26 is about −20° C. Element 27 comprises a conventional heat exchange means, such as an internal coil or an external reboiler, for maintaining the desired temperature at the bottom of column 26. A refrigerant, such as a light naphtha, is circulated through coils 27 at about −15° C. Solvent and unreacted monomer from reactor 44 which have been separated from the polymer product in treater 61 are introduced into the lower portion of column 26 through conduits 76 and 77. The solvent used in the polymerization for either dissolving the polymerization promoter or as a chain transfer agent and its recovery will be discussed more fully hereinafter. Since the polymerization solvent is also higher boiling than the monomer, it is removed with the bottoms product through outlet conduit 33. When trifluorochloroethylene is polymerized at a low temperature to produce a normally solid polymer, an organic peroxide dissolved in trichlorofluoromethane is employed as a promoter and a chain transfer agent is unnecessary.

For operating distillation column 26 at a top temperature of −25° C. and at a kettle temperature of about −20° C. at atmospheric pressure and for low temperature polymerization to produce a solid polymer, a typical composition of the overhead and bottoms streams is shown in Table III below:

*Table III*

Overhead:
  Monomer _____ vol. percent__ 99
  Other materials, such as C₂F₃Cl₃CCl₃F,
    and traces of methyl alcohol and
    water _____vol. percent__ 1
                                      ———
                                      100

Bottoms product:
  C₂F₃Cl₃ _____ vol percent__ 41
  CCl₃F _____do____ 43
  Methyl alcohol _____do____ 5
  Other material _____do____ 1
                                      ———
                                      100

The liquid bottoms product from distillation column 26 continuously passes through conduit 33 to a third fractional distillation column 34 in which the solvent used in the polymerization step, such as CCl₃F, is separated from saturated perhalocarbon (C₂F₃Cl₃) and solvent (methyl alcohol) used in the dehalogenation reaction. Temperature and pressure conditions of distillation column 34 are such that trichlorofluoromethane is passed overhead while trichlorotrifluoroethane and any remaining methyl alcohol are removed as a bottoms product. When using atmospheric pressure in distillation column 34, the kettle temperature will be about 48° C. and the overhead temperature will be about 27° C. for separating trichlorofluoromethane from trichlorotrifluoroethane. For superatmospheric pressures higher temperatures are used. The trichlorotrifluoroethane - containing bottoms product is removed from column 34 through outlet conduit 37 and is continuously returned by means of a pump (not shown) through conduit 24 to dehalogenator 6. Element 36 is a conventional heat exchange means, such as an internal coil or external reboiler, for controlling the kettle temperature of distillation column 34. The overhead product comprising trichlorofluoromethane and less than about one per cent of the other components of the feed is removed from column 34 through conduit 46, a portion of which overhead may be condensed in a conventional cooler 47 and returned through conduit 49 to the upper portion of column 34 as reflux therefor. The discussion of the treatment of the overhead product of column 34 and its return to reactor 44 will be discussed more fully subsequently.

The overhead product from the second distillation column 26 in conduit 28 comprises the monomer and contains traces of contaminants, such as methyl alcohol, solvent and water, which may be formed in the process or which may leak into the system from the heat exchange elements. This vaporous stream in conduit 28 is passed through a conventional cooler 29 in which the vapors are cooled and condensed and resulting condensate is passed from cooler 29 to an accumulator 30. Condensate which is collected in accumulator 30 is returned through conduit 32 to the upper portion of distillation column 26 as liquid reflux for controlling the top temperature thereof. Alternatively or in addition to refluxing with condensate from conduit 32, internal cooling means (not shown) may be positioned within the upper portion of column 26 for causing internal refluxing.

If only that much of the vapors in conduit 28 are condensed as to provide reflux to column 26, the remaining vapors are removed from accumulator 30 through conduit 31 and are passed through absorbers or driers 39 and 41, which are used alternately, to remove oxygen-containing compounds. While one drier or absorber is being used, the other absorber is being filled with fresh absorbent material or the absorbent material therein is being regenerated. Absorbers 39 and 41 contain suitable material for removing traces of water and other oxygen-containing compounds, such as methyl alcohol, present in the gaseous stream. Suitable absorbents comprise phosphorous pentoxide, silica gel, activated carbon, and mixtures thereof; however, various other absorbents may be used which are known to those skilled in the art. Absorbers 39 and 41 are used when a monomer of high purity is required, such as in the polymerization of trifluorochloro-ethylene at a low temperature to produce a normally solid polymer of good physical and chemical stability. The use of absorbers 39 and 41 may be omitted in some instances.

Preferably absorbers 39 and 40 contain alternate layers of phosphorous pentoxide and silica gel. After passage of the monomer stream through absorbers 39 or 41, the stream is passed through conduit 42 to cooler 43 wherein the gaseous stream is cooled and condensed. From condenser or cooler 43, condensate at the desired temperature is passed to reactor 44. It is advantageous although not necessary to provide a holding tank (not shown) to aid in the regulation of the flow of monomer to reactor 44.

To treat the monomer stream in the liquid condition in absorbers 39 and 41, cooler 29 is operated such that substantially the entire effluent stream in conduit 28 is condensed. Condensate from accumulator 30 is then passed through conduit 38 to absorbers 39 and 41, which are operated as described with respect to vapor phase operations. In this modification, cooler 43 may be omitted; however, cooler 43 may be used to further cool the condensate to the desired polymerization temperature after passage through absorbers 39 and 41 without departing from the scope of this invention.

In reactor 44 polymerization of the perfluorochloro-olefin monomer is effected under suitable conditions of polymerization with or without the presence of suitable catalytic materials. According to one embodiment of this invention, trifluorochloroethylene is polymerized in the presence of an organic peroxide catalyst to a normally solid polymer having good physical and chemical characteristics. A particularly suitable catalyst for this embodiment of the invention comprises bis-trichloroacetyl peroxide. The amount of trichloroacetyl peroxide used varies between about 0.01 and about 0.15 per cent of the monomer in the reaction mixture for the solid polymer product. In general, the concentration of catalyst or promoter depends upon the desired product of the process and by increasing the concentration of catalyst or promoter a decrease in molecular weight of the resulting polymer is obtained.

Bis- trichloroacetyl peroxide may be prepared by reacting sodium peroxide with trichloroacetyl chloride at a temperature of about −15° C. The bis-trichloroacetyl peroxide product is extracted from the resulting mixture with trichlorofluoromethane. The bis-trichloroacetyl peroxide is recovered from the trichlorofluoro methane by crystallization.

Various other organic peroxides, such as trifluoroacetyl peroxide, difluorochloroacetyl peroxide, benzoyl peroxide, chloroacetyl peroxide and dichlorofluoroacetyl peroxide have been found capable of promoting the polymerization reaction.

When a peroxide catalyst is used for polymerization at low temperatures to produce a solid polymer, it is desirable to dissolve the catalyst in a suitable solvent. According to the process illustrated, such solvent should have a boiling point below the boiling point of the polymer product and higher than the boiling point of the monomer. The solvent should also be miscible with the perhalo-olefin feed to reactor 44. The quantity of solvent containing the catalyst employed is preferably between about 1 and about 20 per cent of the olefin feed but larger or smaller amounts may be used without departing from the scope of this invention. Preferably, the solvent used for the catalyst in the polymerization of trifluorochloroethylene to a solid polymer is trichlorofluoromethane.

The catalyst is introduced into reactor 44 through conduit 57 after being admixed with fresh or recycled solvent from conduit 56. For the production of a normally solid polymer, a temperature between about —20° C. and about 150° C. is employed depending upon the catalyst and operating conditions used. When using bis-trichloroacetyl peroxide as the catalyst for the production of a solid polymer, temperatures between about —20 and about 25° C. are appropriate. Any pressure up to that at which decomposition becomes appreciable may be employed. At the higher pressures, higher temperatures may be employed, which decreases the time required for the polymerization of the trifluorochloroethylene. It is preferred, therefore, to operate at superatmospheric pressures in excess of about 50 pounds per square inch gage. At a temperature of about —16° C. and atmospheric pressure, approximately seven days of residence time is required for an economical yield of solid polymer. At elevated temperatures and at superatmospheric pressures, a residence time of minutes or seconds is sufficient to obtain an economic yield of polymer.

For effecting thermal polymerization reactions in reactor 44 without a catalyst or with a relatively less active catalyst, relatively high temperatures and pressure are required. Temperatures as high as 600° C. or higher and pressures as high as 30,000 pounds per square inch gage are within the scope of this invention, particularly for use in thermal polymerization. The time required for thermal polymerization, as with catalytic polymerization, varies with the conditions and desired product.

The primary purpose of the trichlorofluoromethane solvent in the production of solid polymers as described heretofore is for dissolving the organic peroxide catalyst in order to assure intimate contact between monomer and catalyst and in order to facilitate handling of the catalyst. In the polymerization of a chlorofluoro-olefin to produce polymer oils a solvent of the chain transfer type is used. Solvents of former type useful as catalyst solvents and diluents comprise difluorodichloromethane, trifluorochloromethane, pentafluorochloroethane, trichlorotrifluoroethane, dichloroperfluorocyclo butane, and perfluoroheptane. Solvents of the latter type useful as chain transfer agents comprise carbon tetrachloride, chloroform, and trichloroethylene.

An organic peroxide is also utilized as a catalyst or promoter in the production of polymer oils. In general, higher temperatures are used than in the production of a solid product.

For a more detailed discussion of the reaction conditions necessary for the polymerization of a perfluorochloro-olefin, such as trifluorochloroethylene, to various normally liquid and solid products reference may be had to my prior and copending application Serial No. 601,387, filed June 25, 1945.

Reactor 44 may comprise a steel bomb surrounded by a suitable heat exchange medium, such as a light naphtha or water, for maintaining the temperature substantially constant during the polymerization reaction. Alternatively, especially for the production of polymer oil, the reactor may comprise tubes or coils surrounded with the heat exchange medium for maintaining the temperature at the desired level and through which the reaction mixture is continuously passed. The length of the tubes or coils are such that with respect to the rate of flow of the reactants sufficient residence time is allowed for an economic yield of product.

When a bomb type reactor is used for polymerization, several reactors are used so that the polymerization step of the process may be continuous. For example, while one reactor is being charged or the polymerization reaction effected, another bomb is heated to evaporate solvent and unreacted monomer, such as in treater 61.

The polymerization product is removed from reactor 44 and passed by a conventional conveying means 59 to treater 61. In treater 61 the polymerization product is heated to evaporate solvent and unpolymerized monomer therefrom. Polymerization product, such as a solid polymer, is recovered from treater 61 at 63 as a product of the process. When the polymerization product is an oil, treater 61 may comprise a settling zone as well as evaporation means for separation of immiscible components from the polymer oil. The evaporated solvent and monomer are passed from treater 61 through conduit 62 to wash tower 64. In wash tower 64 the gaseous stream from conduit 62 is passed upwardly therethrough in contact with a downflowing caustic solution, such as a sodium or potassium hydroxide solution. Impurities, such as acids resulting from the polymerization reaction including trichloroacetic acid, phosgene and their derivatives, are neutralized in wash tower 64 and removed with the wash effluent through conduit 68. A portion of the caustic wash may be recycled by means of pump 71 and conduit 69 to the upper portion of wash tower 64. Fresh caustic solution is introduced into wash tower 64 through conduit 67. The wash tower is maintained at substantially atmospheric conditions of temperature and pressure. Vapors of solvent and monomer substantially free from acidic contaminants but containing entrained caustic solution are passed from wash tower 64 through conduit 72 to absorber or drier 73. In drier 73 the last traces of caustic solution are removed with a suitable material, such as sodium sulfate, calcium sulfate, manganese sulfate, calcium chloride, and bauxite, or mixtures thereof. From drier 73, vapors are passed through a cooler 74 in which the vapors are condensed. From cooler 74, the condensate is passed through conduits 76 and 77 to the lower portion of fractional distillation column 26, as previously discussed.

The solvent, such as trichlorofluoromethane, is removed from distillation column 26 with the bottoms product through outlet conduit 33 and is passed to a third distillation column 34, as previously discussed. In column 34 the solvent for the polymerization reaction is continuously recovered as an overhead product and is passed through conduit 46 to a conventional cooler 47 in which at least a portion of the vaporous overhead is condensed. Condensate is then passed to an accumulator 48. Condensate from accumulator 48 is returned to the upper portion of column 34 through conduit 49 as liquid reflux therefor. When the entire overhead is condensed in cooler 47, condensate is passed from accumulator 48 through conduit 51 to absorbers 53 and 54 to remove oxygen-containing compounds. When only the amount of overhead required for reflux is condensed, uncondensed overhead is passed through conduit 52 to absorbers 53 and 54. As with respect to absorbers 39 and 41, absorbers 53 and 54 are operated similarly and contain similar absorbent materials for removal of traces of the methyl alcohol solvent and water which inhibit the polymerization reaction. Absorbers 53 and 54 are used alternately; while one absorber is being regenerated or refilled, the other is on process flow. Substantially pure solvent, such as trichlorofluoromethane, is returned to reactor 44 through conduits 56 and 57.

The polymer product recovered at 63 may be subjected to further treatment, such as fluorination, pyrolysis, filtration, fractionation of polymer oils by distillation or solvent extraction, etc., without departing from the scope of this invention.

In the storage of the monomer as a liquid, a blanket of nitrogen is maintained over the liquid phase in order to prevent contact between monomer and an oxidizing atmosphere.

As the process of this invention can be applied to the polymerization of other perhalo-olefins whose physical and chemical characteristics lend themselves to the invention described, the specific examples of conditions, reactants and materials described with reference to the drawing should not be construed as limiting to the invention. Various modifications and alterations of the equipment, such as the elimination of one of the distillation steps, may be practiced without departing from the scope of this invention. Certain pieces of apparatus and auxiliary equipment, such as liquid level controls, temperature and pressure controls, valves, pumps, coolers or condensers, and storage facilities have been omitted from the drawing as a matter of convenience and clarity.

Having described my invention, I claim:

1. A process for the production of solid polytrifluorochloroethylene which comprises introducing trichlorotrifluoroethane and methyl alcohol into a dehalogenation zone, dechlorinating trichlorotrifluoroethane in said dehalogenation zone in the presence of excess zinc dust under conditions such that trifluorochloroethylene is produced as the primary product of the dehalogenation reaction, removing from said dehalogenation zone an effluent comprising trifluorochloroethylene, trichlorotrifluoroethane and methyl alcohol, passing said effluent from said dehalogenation zone to a first fractional distillation zone, recovering from said first distillation zone a relatively high-boiling fraction comprising methyl alcohol and a relatively low-boiling fraction comprising trifluorochloroethylene and trichlorotrifluoroethane, returning said relatively high-boiling fraction comprising methyl alcohol to said dehalogenation zone, passing said relatively low-boiling fraction comprising trifluorochloroethylene and trichlorotrifluoroethane to a second fractional distillation zone, recovering from said second fractional distillation zone a relatively low-boiling fraction comprising trifluorochloroethylene, passing trifluorochloroethylene separated in said second distillation zone to a polymerization reaction zone, introducing a solution of trichlorofluoromethane and trichloroacetyl peroxide into said polymerization zone, polymerizing trifluorochloroethylene in said polymerization zone under conditions such that solid polytrifluorochloroethylene is produced as the principal reaction product, evaporating from said solid polytrifluorochloroethylene product unreacted trifluorochloroethylene and trichlorofluoromethane and recovering substantially pure solid polytrifluorochloroethylene as a product of the process, condensing said trifluorochloroethylene and trichlorofluoromethane evaporated from said polymerization product and introducing same into second fractional distillation zone, and simultaneously admixing same therein with said low boiling fraction introduced therein from said first distillation zone, recovering from said second fractional distillation zone a relatively high-boiling fraction comprising trichlorotrifluoroethane and trichlorofluoromethane, passing said relatively high-boiling fraction from said second fractional distillation zone to a third fractional distillation zone, recovering from said third fractional distillation zone a relatively high-boiling fraction comprising trichlorotrifluoroethane and a relatively low-boiling fraction comprising trichlorofluoromethane, passing said relatively high-boiling fraction comprising trichlorotrifluoroethane from said third distillation zone to said dehalogenation zone, and returning trichlorofluoromethane separated in said third fractional distillation zone to said polymerization reaction zone.

2. A process for the production of solid polytrifluorochloroethylene which comprises introducing trichlorotrifluoroethane and methyl alcohol into a dehalogenation zone, dechlorinating trichlorotrifluoroethane in said dehalogenation zone in the presence of excess zinc dust under conditions such that trifluorochloroethylene is produced as the primary product of the dehalogenation reaction, removing from said dehalogenation zone an effluent comprising trifluorochloroethylene, trichlorotrifluoroethane and methyl alcohol, passing said effluent from said dehalogenation zone to a first fractional distillation zone, recovering from said first distillation zone a relatively high-boiling fraction comprising methyl alcohol and a relatively low-boiling fraction comprising trifluorochloroethylene and trichlorotrifluoroethane, returning said relatively high-boiling fraction comprising methyl alcohol to said dehalogenation zone, passing said relatively low-boiling fraction comprising trifluorochloroethylene and trichlorotrifluoroethane to a second fractional distillation zone, recovering from said second fractional distillation zone a relatively low-boiling fraction comprising trifluorochloroethylene, passing trifluorochloroethylene separated in said second distillation zone into a polymerization reaction zone, introducing a solution of trichlorofluoromethane and trichloroacetyl peroxide into said polymerization zone, polymerizing trifluorochloroethylene in said polymerization zone under conditions such that solid polytrifluorochloroethylene is produced as the principal reaction product, evaporating from said solid polytrifluorochloroethylene product unreacted trifluorochloroethylene and trichlorofluoromethane and recovering substantially pure solid polytrifluorochloroethylene as a product of the process, washing trifluorochloroethylene and trichlorofluoromethane vapors recovered by evaporation from said polymerization product with a caustic solution to remove acidic impurities formed by the polymerization reaction, condensing caustic washed vapors of trifluorochloroethylene and trichlorofluoromethane and subsequently introducing same into the lower portion of said second fractional distillation zone and simultaneously admixing same therein with said low boiling fraction introduced therein from said first distillation zone, recovering from said second fractional distillation zone a relatively high-boiling fraction comprising trichlorotrifluoroethane and trichlorofluoromethane, passing said relatively high-boiling fraction from said second fractional distillation zone to a third fractional distillation zone, recovering from said third fractional distillation zone a relatively high-boiling fraction comprising trichlorotrifluoroethane and a relatively low-boiling fraction comprising trichlorofluoromethane, passing said relatively high-boiling fraction comprising trichlorotrifluoroethane from said third distillation zone to said dehalogenation zone, and returning trichlorofluoromethane separated in said third fractional distillation zone to said polymerization reaction zone.

3. A process for the production of solid polytrifluorochloroethylene which comprises introducing trichlorotrifluoroethane and methyl alcohol into a dehalogenation zone, dechlorinating trichlorotrifluoroethane in said dehalogenation zone in the presence of excess zinc dust under conditions such that trifluorochloroethylene is produced as the primary product of the dehalogenation reaction, removing from said dehalogenation zone a gaseous effluent comprising trifluorochloroethylene, trichlorotrifluoroethane and methyl alcohol, passing said effluent to a first fractional distillation zone, recovering from said first distillation zone a relatively high-boiling fraction comprising methyl alcohol and a relatively low-boiling fraction comprising trifluorochloroethylene and trichlorotrifluoroethane, returning said relatively high-boiling fraction comprising methyl alcohol to said dehalogenation reaction zone, passing said relatively low-boiling fraction comprising trifluorochloroethylene and trichlorotrifluoroethane to a second fractional distillation zone, recovering from said second fractional distillation zone a relatively low-boiling fraction comprising trifluorochloroethylene and relatively minor proportion of oxygen-containing compounds comprising methyl alcohol, treating said relatively low-boiling fraction from said second fractional distillation zone with a sorption material comprising $P_2O_5$ under conditions such that the relatively minor proportion of oxygen-containing compounds are substantially completely removed therefrom, introducing purified trifluorochloroethylene substantially free from oxygen-containing compounds into a polymerization reaction zone, introducing a solution of trichlorofluoromethane and trichloroacetyl peroxide into said polymerization zone, polymerizing trifluorochloroethylene in said polymerization zone under conditions such that solid polytrifluorochloroethylene is produced as the principal reaction product, evaporating from said solid polytrifluorochloroethylene product unreacted trifluorochloroethylene and trichlorofluoromethane and recovering substantially pure solid polytrifluorochloroethylene as a product of the process, condensing said trifluorochloroethylene and trichlorofluoromethane evaporated from said polymerization product and introducing same into said second fractional distillation zone and simultaneously admixing same therein with said low-boiling fraction introduced therein from said first distillation zone, recovering from said second fractional distillation zone a relatively high-boiling fraction comprising trichlorotrifluoroethane and trichlorofluoromethane, passing said relatively high-boiling fraction from said second fractional distillation zone to a third fractional distillation zone, recovering from said third fractional distillation zone a relatively high-boiling fraction comprising trichlorotrifluoroethane and a relatively low-boiling fraction comprising trichlorofluoromethane and a relatively minor proportion of oxygen-containing compounds comprising methyl alcohol, passing said relatively high-boiling fraction comprising trichlorotrifluoroethane from said third distillation zone to said dehalogenation zone, treating said low-boiling fraction from said third distillation zone with a sorption material comprising $P_2O_5$ to substantially completely remove oxygen-containing compounds, and passing purified trichlorofluoromethane substantially free from oxygen-containing compounds to said polymerization zone.

4. A process for the production of solid polytrifluorochloroethylene which comprises introducing trichlorotrifluoroethane and methyl alcohol into a dehalogenation zone in the presence of excess zinc dust at a temperature between about 0 and about 150° C. and at a sufficiently low pressure such that trichlorofluoroethylene is produced as the primary product of the dehalogenation reaction and is vaporized, removing from said dehalogenation zone a gaseous effluent comprising trifluorochloroethylene, trichlorotrifluoroethane and methyl alcohol, condensing the effluent from said dehalogenation zone, passing the condensed effluent to a first fractional distillation zone, recovering from said first distillation zone a relatively high-boiling fraction comprising methyl alcohol and a relatively low-boiling fraction comprising trifluorochloroethylene and trichlorotrifluoroethane, returning said relatively high-boiling fraction comprising methyl alcohol to said dehalogenation reaction zone, passing said relatively low-boiling fraction comprising trifluorochloroethylene and trichlorotrifluoroethane to a second fractional distillation zone, recovering from said second fractional distillation zone a relatively low-boiling fraction comprising trifluorochloroethylene, passing trifluorochloroethylene separated in said second distillation zone to a polymerization reaction zone, introducing between about 0.01 and about 0.15 per cent bis-trichloroacetyl peroxide dissolved in trichlorofluoromethane based on olefin in the reaction mixture into said polymerization zone, polymerizing trifluorochloroethylene in said polymerization zone at a temperature between about −20 and about 25° C. such that a normally solid polymer of trifluorochloroethylene is produced as the principal reaction product, evaporating from said polytrifluorochloroethylene product unreacted trifluorochloroethylene and trichlorofluoromethane and recovering a normally solid polymer of substantially pure polytrifluorochloroethylene as a product of the process, condensing said trifluorochloroethylene and trichlorofluoromethane evaporated from said polymerization product and introducing same into said second fractional distillation zone and simultaneously admixing same therein with said low-boiling fraction introduced therein from said first distillation zone, recovering from said second distillation zone a relatively high-boiling fraction comprising trichlorotrifluoroethane and trichlorofluoromethane, passing said relatively high-boiling fraction from said second fractional distillation zone to a third fractional distillation zone, recovering from said third fractional distillation zone a relatively high-boiling fraction comprising trichlorotrifluoroethane and a relatively low-boiling fraction comprising trichlorofluoromethane, passing said relatively high-boiling fraction comprising trichlorotrifluoroethane from said third distillation zone to said dehalogenation zone, and returning trichlorofluoromethane separated in said third fractional distillation zone to said polymerization reaction zone.

5. A process for the production of solid polytrifluorochloroethylene which comprises introducing trichlorotrifluoroethane and an alcohol into a dehalogenation zone, dechlorinating trichlorotrifluoroethane in said dehalogenation zone in the presence of a metal dehalogenating agent to produce trifluorochloroethylene, removing from said dehalogenation zone an effluent comprising trifluorochloroethylene, trichlorotrifluoroethane and alcohol, passing said effluent from said dehalogenation zone to a first distillation zone, recovering from said first distillation zone a relatively high boiling fraction comprising alcohol and a relatively low boiling fraction comprising trifluorochloroethylene and trichlorotrifluoroethane, returning said relatively high boiling fraction comprising alcohol to said dehalogenation zone, passing said relatively low boiling fraction comprising trifluorochloroethylene and trichlorotrifluoroethane to a second distillation zone, recovering from said second distillation zone a relatively low boiling fraction comprising trifluorochloroethylene, passing trifluorochloroethylene thus separated in said second distillation zone to a polymerization reaction zone, introducing a solvent having a higher boiling point than the monomer and a lower boiling point than the polytrifluorochloroethylene produced by the process and a catalyst into said polymerization zone, polymerizing trifluorochloroethylene in said polymerization zone to produce solid polytrifluorochloroethylene, removing a reaction mixture from said polymerization zone and separating unreacted trifluorochloroethylene and solvent from the solid polytrifluorochloroethylene product, passing the thus separated trifluorochloroethylene and solvent to said second distillation zone and simultaneously admixing same therein with said low-boiling fraction introduced therein from said first distillation zone, recovering from said second distillation zone a relatively high boiling fraction comprising trichlorotrifluoroethane and solvent used in said polymerization reaction zone, passing said relatively high boiling fraction from said second distillation zone to a third distillation zone, recovering from said third distillation zone a relatively high boiling fraction comprising trichlorotrifluoroethane and a relatively low boiling fraction comprising the solvent used in said polymerization zone, passing said relatively high boiling fraction from said third distillation zone to said dehalogenation zone, and returning said relatively low boiling fraction from said third distillation zone to said polymerization zone.

6. A process for the production of a solid trifluorochloroethylene polymer which comprises introducing trichlorotrifluoroethane into a dehalogenation zone, dechlorinating said trichlorotrifluoroethane in the dehalogenation zone in the presence of a metal dehalogenating agent to produce a trifluorochloroethylene, removing from said dehalogenation zone an effluent comprising trifluorochloroethylene and trichlorotrifluoroethane, passing trifluorochloroethylene and trichlorotrifluoroethane from said dehalogenation zone to a first distillation zone, recovering from said first distillation zone a relatively low boiling fraction comprising trifluorochloroethylene, passing trifluorochloroethylene of said low boiling fraction from said first distillation zone to a polymerization zone, introducing into said polymerization zone a solvent having a higher boiling point than the monomer and a lower boiling point than polymer produced in said polymerization zone, polymerizing trifluorochloroethylene in said polymerization zone to produce a solid polymer, separating from said polymer solvent and unreacted trifluorochloroethylene and recovering solid polytrifluorochloroethylene polymer as a product of the process, introducing solvent and unreacted trifluorochloroethylene separated from the polymerization product of said polymerization zone into said first distillation zone and simultaneously admixing same therein with trifluorochloroethylene and trichlorotrifluoroethane passed thereto from said dehalogenation zone, recovering from said first distillation zone a relatively high boiling fraction comprising trichlorotrifluoroethane and solvent, passing said relatively high boiling fraction from said first distillation zone to a second distillation zone, recovering from said second distillation zone a fraction comprising trichlorotrifluoroethane and a fraction comprising solvent, passing said fraction comprising trichlorotrifluoroethane from said second distillation zone to said dehalogenation zone, and returning solvent from said second distillation zone to said polymerization zone.

7. A process for the production of a solid trifluorochloroethylene polymer which comprises introducing trichlorotrifluoroethane into a dehalogenation zone, dechlorinating said trichlorotrifluoroethane in the dehalogenation zone in the presence of a metal dehalogenating agent at a temperature between about 0° C. and about 150° C. to produce trifluorochloroethylene, removing from said dehalogenation zone an effluent comprising trifluorochloroethylene and trichlorotrifluoroethane, passing trifluorochloroethylene and trichlorotrifluoroethane to a first distillation zone, recovering from said first distillation zone a relatively low boiling fraction comprising trifluorochloroethylene, passing trifluorochloroethylene of said low boiling fraction from said first distillation zone to a polymerization zone, introducing into said polymerization zone a solvent having a higher boiling point than the monomer and a lower boiling point than polymer produced in said polymerization zone, polymerizing trifluorochloroethylene in said polymerization zone in the presence of a promoter at a temperature between about −20° C. and about 25° C. for a sufficient reaction time to produce a solid polymer, separating from said polymer solvent and unreacted trifluorochloroethylene and recovering solid polytrifluorochloroethylene polymer as a product of the process, introducing solvent and unreacted trifluorochloroethylene separated from the polymerization product of said polymerization zone into said first distillation zone and simultaneously admixing same therein with trifluorochloroethylene and trichlorotrifluoroethane passed thereto from said dehalogenation zone, recovering from said first distillation zone a relatively high boiling fraction comprising trichlorotrifluoroethane and solvent, passing said relatively high boiling fraction from said first distillation zone to a second distillation zone, recovering from said second distillation zone a fraction comprising trichlorotrifluoroethane and a fraction comprising solvent, passing said fraction comprising trichlorotrifluoroethane from said second distillation zone to said dehalogenation zone, and returning solvent from said second distillation zone to said polymerization zone.

WILLIAM T. MILLER.

REFERENCES CITED

The following references are of record in the file of this patent:

UNITED STATES PATENTS

| Number | Name | Date |
|---|---|---|
| 2,399,672 | Green et al. | May 7, 1946 |
| 2,401,897 | Benning | June 11, 1946 |

FOREIGN PATENTS

| Number | Country | Date |
|---|---|---|
| 796,026 | France | Mar. 27, 1936 |
| 465,520 | Great Britain | May 3, 1937 |

OTHER REFERENCES

Belmore et al.: Ind. Eng. Chem., 39, 338–342, (1947).

Durrans: "Solvents," pages 179, 180 (Chapman & Hall, 1938).

Lange: "Handbook of Chemistry," page 1205 (1941).